US010775319B2

(12) United States Patent
Niikura et al.

(10) Patent No.: US 10,775,319 B2
(45) Date of Patent: Sep. 15, 2020

(54) VISUAL SENSOR LENS OR LENS COVER ABNORMALITY DETECTION SYSTEM

(71) Applicant: FANUC CORPORATION, Yamanashi (JP)

(72) Inventors: Miho Niikura, Yamanashi (JP); Yasuhiko Kurosumi, Yamanashi (JP); Yoshihiko Tarui, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/420,298

(22) Filed: May 23, 2019

(65) Prior Publication Data

US 2019/0369031 A1   Dec. 5, 2019

(30) Foreign Application Priority Data

Jun. 1, 2018  (JP) ................................ 2018-106252

(51) Int. Cl.
| | |
|---|---|
| *G03B 27/42* | (2006.01) |
| *G03B 27/52* | (2006.01) |
| *G01N 21/958* | (2006.01) |
| *G03B 11/04* | (2006.01) |
| *H04N 5/225* | (2006.01) |

(52) U.S. Cl.
CPC ......... *G01N 21/958* (2013.01); *G03B 11/041* (2013.01); *H04N 5/2254* (2013.01); *G01N 2021/9583* (2013.01)

(58) Field of Classification Search
CPC .............. G01N 21/94; G01N 21/958; G01N 2021/9583; G01N 21/88; G01N 21/8806; G01N 2021/157; G03F 7/70925; G03F 7/70916; G02B 27/0006
See application file for complete search history.

(56) References Cited

U.S. PATENT DOCUMENTS

2006/0077367 A1* 4/2006 Kobayashi ............. G03B 27/52
355/53

FOREIGN PATENT DOCUMENTS

| JP | H05-346307 A | 12/1993 |
|---|---|---|
| JP | H06-148083 A | 5/1994 |
| JP | H11-096838 A | 4/1999 |
| JP | H11-352852 A | 12/1999 |
| JP | 2005-117262 A | 4/2005 |
| JP | 2007-024638 A | 2/2007 |
| JP | 2008-241650 A | 10/2008 |

(Continued)

OTHER PUBLICATIONS

An Office Action; "Notification of Reasons for Refusal," mailed by the Japanese Patent Office dated April 14, 2020, which corresponds to Japanese Patent Application No. 2018-106252 and is related to U.S. Appl. No. 16/420,298; with English language translation.

*Primary Examiner* — Mesfin T Asfaw
(74) *Attorney, Agent, or Firm* — Studebaker & Brackett PC

(57) ABSTRACT

A system includes a visual sensor provided in an industrial machine or in the vicinity thereof to acquire a plurality of image data, a calculation unit that calculates a contamination degree of a lens or a lens cover of the visual sensor on the basis of the image data acquired by the visual sensor, and a prediction unit that calculates information on a predicted cleaning timing to be performed in the future, of the lens or the lens cover on the basis of the calculated contamination degree of the lens or the lens cover.

20 Claims, 9 Drawing Sheets

(56) References Cited

FOREIGN PATENT DOCUMENTS

| JP | 2012-173405 A | 9/2012 |
| JP | 2013-096922 A | 5/2013 |

* cited by examiner

IMAGE PROCESSING

RANGE WHERE CONTAMINATION IS NEGLIGIBLE

PHOTOGRAPHING POSITION IS SHIFTED

VISUAL SENSOR LENS OR LENS COVER ABNORMALITY DETECTION SYSTEM

This application is based on and claims the benefit of priority from Japanese Patent Application No. 2018-106252, filed on 1 Jun. 2018, the content of which is incorporated herein by reference.

BACKGROUND OF THE INVENTION

Field of the Invention

The present invention relates to an abnormality detection system for detecting abnormalities in lenses or lens cover of a visual sensor. More specifically, the present invention relates to an abnormality detection system for detecting abnormalities in lenses or lens covers of a visual sensor, for monitoring a contamination degree of a lens or a lens cover of a visual sensor provided in a production system including an industrial machine.

Related Art

Visual sensors for obtaining visual information on a target object are provided in various industrial machines such as a robot or a machine tool that conveys and machines the target object and an inspection device for determining the quality of the target object. For example, a conveying robot that conveys a target object from a predetermined position to a subsequent predetermined position detects the position and the attitude of a target object on the basis of visual information obtained by visual sensors, grasps the target object at an appropriate position, and conveys the target object to a predetermined position. In a production system including such a visual sensor and an industrial machine, when a contamination adheres to a lens of a visual sensor and a desirable image is not obtained by the visual sensor, an industrial machine controlled using the visual information obtained by the visual sensor may be unable to perform an appropriate function.

For example, Patent Document 1 proposes a technology related to a production system which includes means for determining a lens contamination of a camera and which outputs a warning alarm and inhibits detection of a region which is determined to be contaminated.

For example, Patent Document 2 proposes a technology related to a production system in which, when it is not possible to detect marks provided on a work, since deterioration of a lamp or a contamination of the lens of a video camera is considered to be the cause of failure to detection, a warning light is turned on to detect a maintenance period for replacement of a lamp and cleaning of the video camera.

Patent Document 1: Japanese Unexamined Patent Application, Publication No. H06-148083

Patent Document 2: Japanese Unexamined Patent Application, Publication No. H05-346307

SUMMARY OF THE INVENTION

According to the technology disclosed in Patent Document 1, when it is determined that there is a lens contamination, since a warning alarm is output, it can be understood that a timing at which the warning alarm is output is the timing at which maintenance such as cleaning of a lens is necessary. According to the technology disclosed in Patent Document 2, since a warning light is turned on when it is not possible to detect marks provided on a work, it can be understood that a timing at which the warning alarm is turned on is the timing at which maintenance such as replacement of a lamp or cleaning of a lens is necessary.

However, in a production system, it is important to perform maintenance without decreasing the rate of operation of a production line. However, in the technologies disclosed in Patent Documents 1 and 2, since it is not possible to predict the cleaning timing of the lens of a visual sensor, to be performed in the future, it is necessary to perform maintenance such as cleaning of a lens whenever an alarm is output. Such a countermeasure leads to decrease in the rate of operation of a production line.

The present invention has been made in view of the above-described problems, and an object thereof is to provide a visual sensor lens or lens cover abnormality detection system capable of predicting a cleaning timing of a lens or a lens cover of a visual sensor, to be performed in the future. In this way, it is possible to execute maintenance in an appropriate timing and prevent decrease in the rate of operation of a production line.

(1) A visual sensor lens or lens cover abnormality detection system (for example, a lens abnormality detection system 1) according to the present invention includes: a visual sensor (for example, a camera 6) that is provided in an industrial machine (for example, a robot 5) or the vicinity thereof to acquire a plurality of images; a calculation unit (for example, an information processing device including a contamination degree calculation unit 41) that calculates a contamination degree (for example, a contamination index) of the lens or the lens cover of the visual sensor on the basis of the image data photographed by the visual sensor; and a prediction unit (for example, a cleaning timing prediction unit 43) that calculates information on a predicted cleaning timing to be performed in the future, of the lens or the lens cover on the basis of the contamination degree of the lens or the lens cover calculated by the calculation unit.

(2) The visual sensor lens or lens cover abnormality detection system according to (1) may further include: a determination unit (for example, a contamination degree determination unit 42) that determines whether the contamination degree of the lens or the lens cover is equal to or smaller than a predetermined threshold; a notification unit (for example, a display device 23) that notifies of the information on the predicted cleaning timing; and a stop signal output unit (for example, an information processing device 20 including a contamination degree determination unit 42) that outputs a stop signal for stopping an operation of the industrial machine, and the notification unit may notify of the information on the predicted cleaning timing when a determination result obtained by the determination unit is equal to or smaller than the threshold, and the stop signal output unit may output the stop signal when the determination result obtained by the determination unit exceeds the threshold.

(3) In the visual sensor lens or lens cover abnormality detection system according to (1) or (2), the calculation unit may calculate the contamination degree of the lens or the lens cover on the basis of comparison between information based on an initial image and information based on a post-operation image.

(4) In the visual sensor lens or lens cover abnormality detection system according to (3), the calculation unit may determine a contamination region in an image on the basis of a difference between a binary image based on a pixel value of the initial image and a binary image based on a pixel value of the post-operation image and calculate the contamination degree of the lens or the lens cover on the basis of a size of a contamination region in the image.

(5) The visual sensor lens or lens cover abnormality detection system according to any one of (1) to (4) may further include: a reference photographing target which is a target photographed by the visual sensor when calculating the contamination degree of the lens or the lens cover, and the visual sensor and/or the reference photographing target may be fixed to a movable unit (for example, a robot 5), and the movable unit may be operable so that the reference photographing target falls within a photographing range of the visual sensor.

(6) The visual sensor lens or lens cover abnormality detection system according to any one of (1) to (4) may further include: a reference photographing target which is a target photographed by the visual sensor when calculating the contamination degree of the lens or the lens cover, wherein the reference photographing target is a lens cap (for example, a lens cap 12) that covers the lens or the lens cover of the visual sensor.

(7) In the visual sensor lens or lens cover abnormality detection system according to any one of (1) to (6), wherein the predicted cleaning timing may be calculated on the basis of a function derived on the basis of photographing timings of the plurality of images and the contamination degrees of the plurality of images, and an allowable limit threshold of the contamination degree of the lens or the lens cover.

(8) The visual sensor lens or lens cover abnormality detection system according to any one of (1) to (7) may further include: a restart process execution unit (for example, a restart process execution unit 44) that compares a first contamination degree of the lens or the lens cover in a first post-operation image and a second contamination degree of the lens or the lens cover in a second post-operation image photographed at a timing subsequent to the first post-operation image and executes a restart process of the abnormality detection system on the basis of a comparison result, and the restart process execution unit executes the restart process when the second contamination degree is decreased by a predetermined value or more from the first contamination degree.

(9) The visual sensor lens or lens cover abnormality detection system according to (1) may further include: a determination unit (for example, a contamination degree determination unit 42) that determines whether the contamination degree of the lens or the lens cover exceeds a predetermined threshold; a usable region specifying unit (for example, a usable region specifying unit 45) that specifies a usable region in which the contamination of the lens or the lens cover is negligible in the image photographed by the visual sensor; and an information output unit (for example, an information processing device 20) that outputs information for controlling an operation of the industrial machine, the usable region specifying unit may specify the usable region when a determination result obtained by the determination unit exceeds the threshold, and the information output unit may output information for causing the operation of the industrial machine to be continued when the size of the usable region specified by the usable region specifying unit is a predetermined size or more, and the information output unit may output information for stopping the operation of the industrial machine when the size of the usable region is smaller than the predetermined size.

(10) In the visual sensor lens or lens cover abnormality detection system according to (8), the visual sensor may have a movable unit for changing a photographing position, and when the size of the usable region is equal to or larger than the predetermined size, the movable unit may be operated so as to change the photographing position of the visual sensor so that at least a portion of a photographing target object is within the usable region.

(11) The visual sensor lens or lens cover abnormality detection system according to (1) may further include: an information output unit (for example, an information processing device 20) that outputs information for controlling an operation of the industrial machine and the visual sensor, a plurality of visual sensors may be provided, the calculation unit may calculate the contamination degree of the lens or the lens cover of each of the plurality of visual sensors (for example, cameras 6a, 6b, 6c, and 6d), and when a visual sensor in which the contamination degree of the lens or the lens cover exceeds a predetermined threshold is detected, the information output unit may cause photographing to be continued using another visual sensor in which the contamination degree of the lens or the lens cover is equal to or smaller than the predetermined threshold instead of the visual sensor and output information for causing the operation of the industrial machine to be continued.

(12) A non-transitory computer-readable medium according to the present invention has a visual sensor lens or lens cover abnormality detection program recorded thereon, the program causing a computer that forms an information processing device (for example, an information processing device 20) of a visual sensor lens or lens cover abnormality detection system (for example, a lens abnormality detection system 1) including a visual sensor (for example, a camera 6) that is provided in an industrial machine (for example, a robot 5) or the vicinity thereof to acquire a plurality of pieces of image data to realize: a calculation function (for example, a function of an information processing device 20 including a contamination degree calculation unit 41) of calculating a contamination degree (for example, a contamination index) of the lens or the lens cover of the visual sensor on the basis of the image data photographed by the visual sensor; and a prediction function (for example, a function of a cleaning timing prediction unit 43) of calculating information on a predicted cleaning timing to be performed in the future, of the lens or the lens cover on the basis of the contamination degree of the lens or the lens cover calculated by the calculation function.

According to the present invention, it is possible to provide a visual sensor lens or lens cover abnormality detection system capable of predicting a cleaning timing of a lens or a lens cover of a visual sensor, to be performed in the future. In this way, it is possible to execute maintenance in an appropriate timing and prevent decrease in the rate of operation of a production line.

DETAILED DESCRIPTION OF THE INVENTION

First Embodiment

Figure 1:
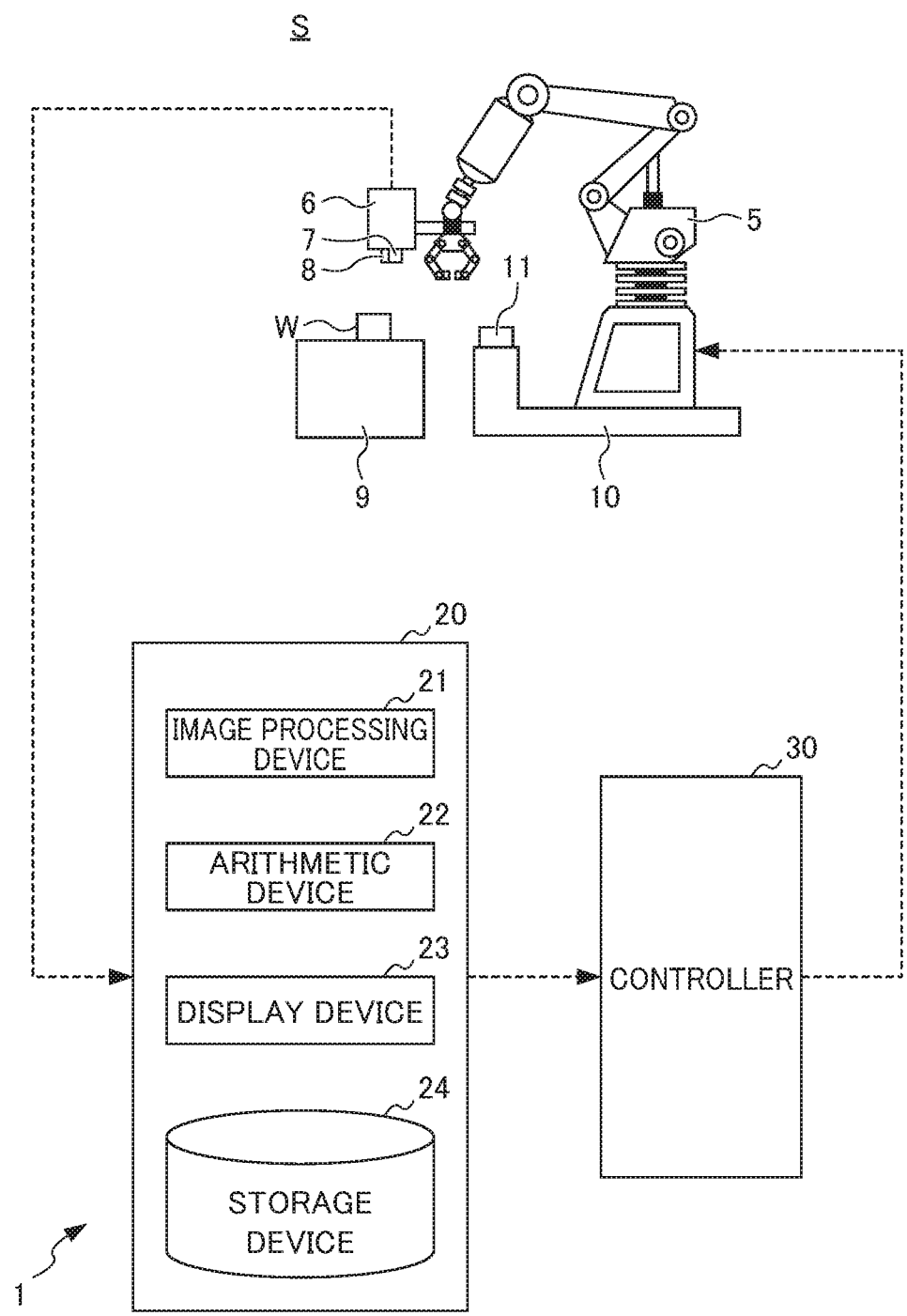
FIG. 1 is a diagram illustrating an entire configuration of a production system in which a camera lens abnormality detection system according to a first embodiment of the present invention is included.

Hereinafter, a first embodiment of the present invention will be described with reference to FIG. 1. FIG. 1 is a diagram illustrating an entire configuration of a production system S in which a visual sensor according to the present embodiment is included.

The production system S includes a robot 5 as an industrial machine, a camera 6 as a visual sensor provided in the robot 5, an information processing device 20 that executes a process of monitoring a contamination state of a lens, and a controller 30 that controls the robot 5, the camera 6, and the like on the basis of various pieces of information such as the output of the camera 6 processed by the information processing device 20. Here, in the present embodiment, the camera 6 and the information processing device 20 form a lens abnormality detection system 1 of the present invention.

The robot 5 is a conveying robot that executes a series of conveying operations of grasping a work W as a to b which is a component of a product at a predetermined position according to a control signal transmitted from the controller 30 and conveying the grasped work W to a subsequent previous position.

The camera 6 is provided in the robot 5 to photograph the work W or the like according to a request from the controller 30 to obtain an image signal and transmit the image signal to the information processing device 20 at a predetermined period. The camera 6 has a lens holder 7 in which a lens is held. Moreover, an illumination unit 8 for radiating an illumination light to the work W is provided in the camera 6.

The information processing device 20 is configured as a computer including an image processing device 21 that processes the output of the camera 6, an arithmetic device 22 that executes an arithmetic operation for monitoring a contamination degree of the lens of the camera 6 on the basis of the information processed by the image processing device 21, a display device 23 as a notification unit that displays an arithmetic result obtained by the arithmetic device 22 in such a form as to be visually perceived by an operator, and a storage device 24 that stores a program for realizing various functions to be described later and various pieces of information.

The image processing device 21 performs various processes on the image signal transmitted from the camera 6. The image processing device 21 transmits the processed information to the controller 30 and the arithmetic device 22 at a predetermined period. Here, the information transmitted from the image processing device 21 includes image information obtained by photographing a reference photographing target to be described later, image information including the work W, and information related to a detection position of the work W detected from an image and an error thereof, for example.

Figure 2:
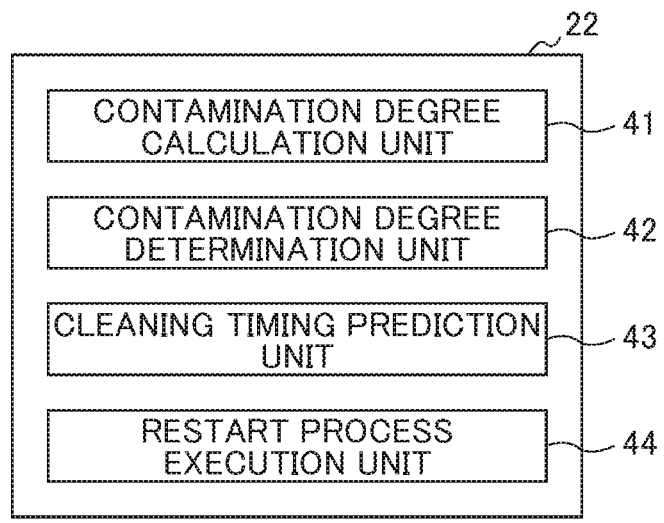
FIG. 2 is a functional block diagram illustrating a configuration of a functional module of an arithmetic device of the lens abnormality detection system according to the embodiment.

The arithmetic device 22 executes a process of monitoring a contamination state of the lens on the basis of the information transmitted from the image processing device 21. FIG. 2 is a functional block diagram illustrating a configuration of functional modules of the arithmetic device 22.

The arithmetic device 22 includes a contamination degree calculation unit 41, a contamination degree determination unit 42, and a cleaning timing prediction unit 43 as functional modules thereof. With these functional modules, the arithmetic device 22 calculates a contamination degree of the lens of the camera 6 to predict a cleaning timing of the lens of the camera 6, to be performed in the future. Moreover, the arithmetic device 22 includes a restart process execution unit 44 to be described later. Hereinafter, the functions of the respective functional modules 41 to 43 configured to be implementable by the arithmetic operation of the arithmetic device 22 will be described.

The contamination degree calculation unit 41 calculates a contamination degree of the lens of the camera 6 on the basis of the information transmitted from the image processing device 21. The details of a method of calculating the contamination degree will be described later with reference to FIGS. 3 and 4. Moreover, the calculated information on the contamination degree is transmitted to the contamination degree determination unit 42.

The contamination degree determination unit 42 determines whether the contamination degree calculated by the contamination degree calculation unit 41 exceeds a predetermined threshold. When the contamination degree exceeds the threshold, a stop signal for stopping an operation such as a machining operation of an industrial machine such as the robot 5 is transmitted to the controller 30. Here, the contamination degree determination unit 42 of the information processing device 20 also performs the function of a stop signal output unit that outputs a stop signal for stopping the operation of the robot 5 or the like. On the other hand, when the contamination degree is equal to or smaller than the threshold, the information on the contamination degree is transmitted to the cleaning timing prediction unit 43 in order to calculate a predicted cleaning timing.

The cleaning timing prediction unit 43 calculates a cleaning timing (that is, a predicted cleaning timing) to be performed in the future on the basis of the contamination degree calculated by the contamination degree calculation unit 41. The details of a method of calculating the predicted cleaning timing will be described later with reference to FIGS. 5 to 7. The calculated information on the predicted cleaning timing is transmitted to the display device 23.

The display device 23 displays information related to the predicted cleaning timing of the lens of the camera 6 on the basis of the information on the predicted cleaning timing transmitted from the cleaning timing prediction unit 43 and notifies an operator of the predicted cleaning timing.

The storage device 24 stores various pieces of information such as the image signal transmitted from the camera 6, the information processed by the image processing device 21, and the information calculated by the arithmetic device 22. Moreover, the image signal transmitted from the camera 6 may be temporarily stored in the storage device 24, and the image processing device 21 and the arithmetic device 22 may read the stored image signal as necessary execute the above-described processes.

The controller 30 controls the robot 5, the camera 6, and the like. The controller 30 generates a control signal for causing the robot 5 to execute a conveying operation on the basis of the information processed by the information processing device 20 and transmits the control signal to the robot 5. For example, the information processing device 20 generates position correction information on the basis of information such as a detection position of the work W detected from an image and the controller 30 transmits a control signal corresponding to the position correction information to the robot 5. In this way, it is possible to control the robot 5 in a state in which a positional relation between the work W and the robot 5 is corrected. Moreover, the controller 30 generates a control signal for causing the camera 6 to photograph the work W and the like and transmits the control signal to the camera 6.

Figure 3:
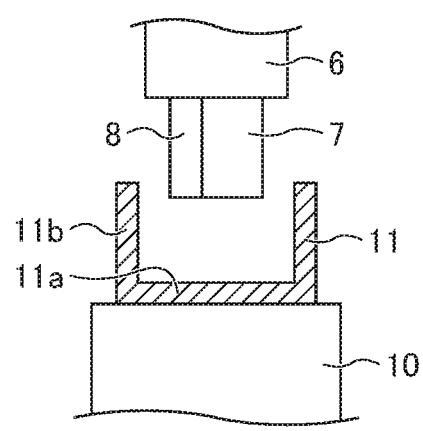
FIG. 3 is an enlarged view of the lens abnormality detection system according to the embodiment when a camera approaches a cap-shaped member.

Next, a process of calculating the contamination degree of the lens of the camera 6 will be described with reference to FIGS. 3 and 4. FIG. 3 is an enlarged view illustrating a state in which an arm of the robot 5 illustrated in FIG. 1 is moved so that the lens holder 7 of the camera 6 approaches the cap-shaped member 11 having a reference photographing target.

The cap-shaped member 11 is attached to a pedestal 10 that fixes the robot 5. When the contamination degree of the lens of the camera 6 is calculated, the arm of the robot 5 as a movable unit is moved and the camera 6 photographs a bottom portion 11a of the cap-shaped member 11. Here, since a positional relation between the cap-shaped member 11 and a reference position of the robot 5 is always constant, the control of moving the arm of the robot 5 may be control of moving the arm to an always-the-same place when an image for calculating the contamination degree is acquired. Therefore, the control at that time is simple.

The bottom portion 11a of the cap-shaped member 11 forms the reference photographing target, and an always-the-same image is generally obtained when this portion is photographed. A predetermined mark is drawn on the bottom portion 11a of the cap-shaped member 11. The predetermined mark may be an arbitrary mark if the mark is used as a reference for a subsequent process and may be a mark that resembles the work W, for example. Moreover, the predetermined mark is not limited to such a mark as illustrated in FIG. 4 but may be a grid-shaped mark, for example. Moreover, since the reference photographing target is a portion of which the first object is to acquire an image for calculating the degree of contamination, the reference photographing target may be a portion on which a mark is not drawn (for example, a portion having a uniform surface with a specific color such as white). Moreover, the distance from an upper surface of the cap-shaped member 11 to the bottom portion 11a is preferably set to be within a focal distance of the camera 6.

Here, the cap-shaped member 11 has a cylindrical portion 11b that surrounds the circumference of the bottom portion in order to eliminate the influence of an external factor such as an external illumination light during photographing. Due to this configuration, when an illumination light is radiated from the illumination unit 8 under predetermined illumination conditions to photograph the bottom portion 11a of the cap-shaped member 11, it is possible to acquire an image with always constant brightness and color except when a contamination adheres to the lens of the camera 6. Therefore, a process of calculating the contamination degree of the lens of the camera 6 to be described later can be executed more accurately.

FIG. 4 is a diagram for describing a process of calculating the contamination degree of the lens of the camera 6. First, in a state in which a contamination is not present on the lens of the camera 6, the lens abnormality detection system 1 is activated to guide the lens holder 7 of the camera 6 fixed to the robot 5 to the vicinity of the cap-shaped member 11. In this way, the robot 5 as a movable unit to which the camera 6 is fixed can operate the camera 6 so that the reference photographing target falls within the photographing range of the camera 6. This state is an initial state and an image of the reference photographing target photographed in the initial state is stored as an initial image.

Figure 4A:
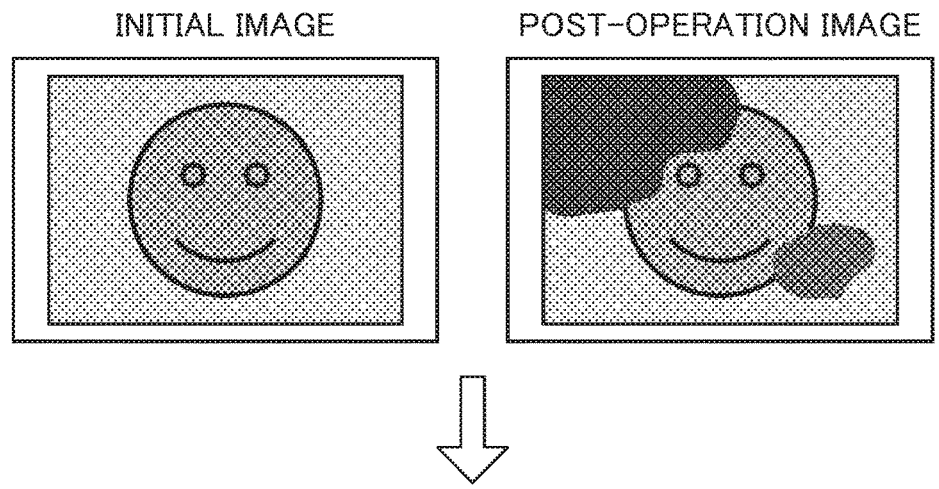
FIG. 4A is a diagram for describing a process of calculating a contamination degree of a camera lens in the lens abnormality detection system according to the embodiment.

Subsequently, an operation similar to the photographing of the initial image is executed automatically every arbitrary period determined in advance by an operator or at a timing based on a manual operation of the operator to acquire an image of the reference photographing target again. This image is stored as a post-operation image. The initial image and the post-operation image photographed in this manner are illustrated in FIG. 4A.

Figure 4B:
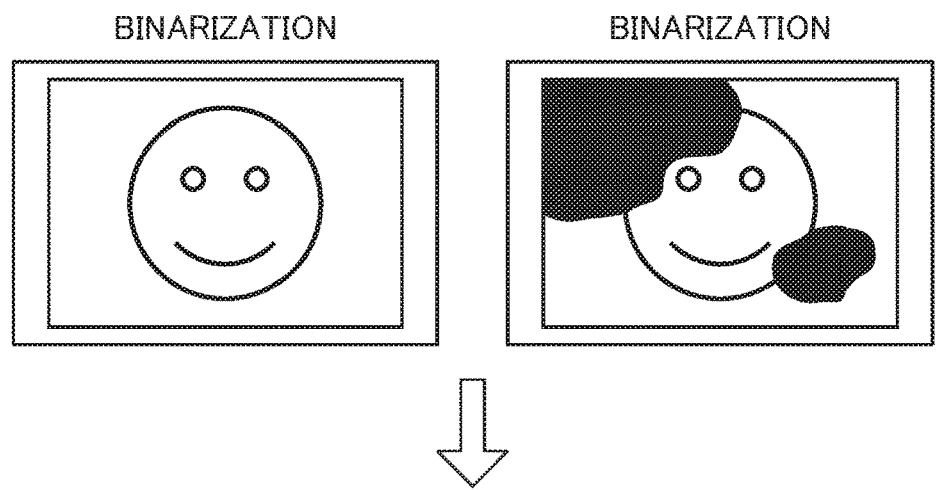
FIG. 4B is a diagram for describing a process of calculating a contamination degree of a camera lens in the lens abnormality detection system according to the embodiment.
Figure 4C:
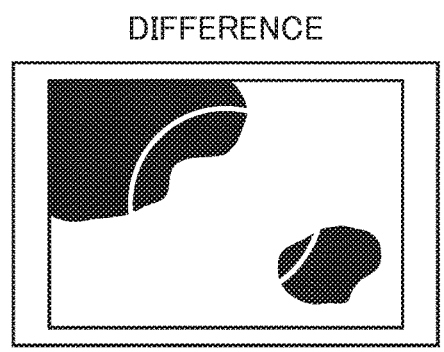
FIG. 4C is a diagram for describing a process of calculating a contamination degree of a camera lens in the lens abnormality detection system according to the embodiment.

As illustrated in FIG. 4B, the image processing device 21 binarizes a pixel value of the initial image and a pixel value of the post-operation image on the basis of a predetermined threshold to generate binary images. Furthermore, as illustrated in FIG. 4C, the image processing device 21 generates a difference image on the basis of a difference between the binary image of the initial image and the binary image of the post-operation image.

The contamination degree calculation unit 41 of the arithmetic device 22 calculates the contamination degree of the lens on the basis of the information on the difference image generated by the image processing device 21. Here, when there is no contamination adhering to the lens of the camera 6, since the binary image of the initial image and the binary image of the post-operation image are the same image, the difference image of both images has a value of zero in the entire region thereof. On the other hand, when there is a contamination adhering to the lens of the camera 6, the difference value is not zero in a portion to which a contamination adheres. Therefore, the contamination degree calculation unit 41 can determine that a portion in which the difference value is not zero is a contamination region in the photographed image. Due to such a binarization process, it is possible to determine a contamination region accurately and easily.

The contamination degree calculation unit 41 calculates a contamination index as the contamination degree by dividing the size of an area determined to be a contamination region by the size of an entire photographed image region. The contamination index is an index having the value of 0 to 1 and is zero in an initial state. Processes subsequent to the binarization process may be executed by the image processing device 21 or the contamination degree calculation unit 41 of the arithmetic device 22. A method of determining a contamination region may not follow the binarization method but various methods such as a method of acquiring the difference image using the pixel value of an image as it is, for example, may be used. Moreover, the contamination degree of the lens may be calculated without determining a contamination region. That is, various methods of calculating the contamination degree of the lens on the basis of comparison between information based on an initial image and information based on a post-operation image may be used. For example, the information on the pixel value of an image is considered to indicate the density of a contamination. Therefore, a pixel value of an initial image and a pixel value of a post-operation image may be compared to acquire information indicating the degree of change in the density of a contamination, and the contamination degree of the lens may be obtained on the basis of the information.

As described above, since the contamination degree of the lens is calculated on the basis of an image obtained by photographing a reference photographing target, it is possible to calculate the contamination degree accurately. Moreover, since the contamination degree of the lens is calculated on the basis of the image obtained by photographing the reference photographing target under a predetermined illumination condition, it is possible to calculate the contamination degree more accurately. Furthermore, since the cylindrical portion 11b is provided as elimination means for eliminating the influence of an externally induced light when photographing a predetermined target, it is possible to calculate the contamination degree of the lens more accurately without being influenced by the externally induced light.

Next, by referring to the graphs of FIGS. 5 to 7, a process of calculating a cleaning timing (that is, a predicted cleaning timing) of the lens of the camera 6, to be performed in the future on the basis of the contamination degree calculated by the contamination degree calculation unit 41 will be described.

Figure 5:
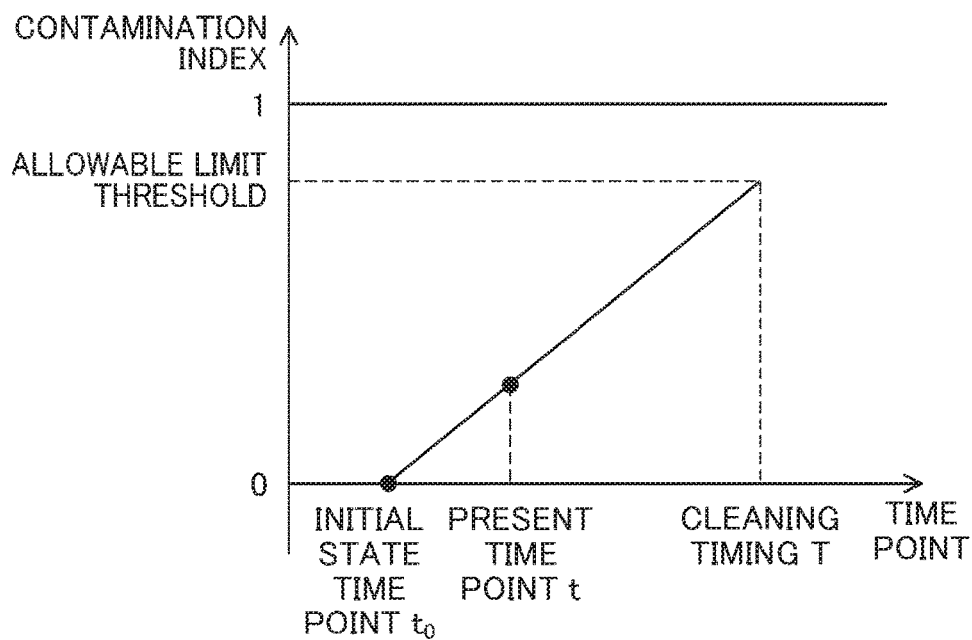
FIG. 5 is a graph for describing a method of calculating a predicted cleaning timing when there is one image photographed after an initial image is obtained, in the lens abnormality detection system according to the embodiment.

FIG. 5 illustrates a graph in which a horizontal axis indicates time and a vertical axis indicates a contamination index. As illustrated in on the vertical axis of FIG. 5, an allowable limit threshold referred to when calculating a predicted lens cleaning timing is set in the contamination index. The allowable limit threshold is set in advance as a value in which it is considered that the control of the robot 5 based on the output of the camera 6 is not performed normally due to an extreme contamination of the lens (for example, a value in which it is considered that a position correction process of the work W based on the image information is not performed normally).

FIG. 5 illustrates a method of calculating the predicted cleaning timing when there is one image photographed after an initial image is obtained. In this case, a function is derived on the basis of a photographing timing t0 of the initial image, a photographing timing t of the post-operation image, and a contamination index of the post-operation image. Moreover, the time until the contamination index reaches the allowable limit threshold is calculated on the basis of this function, and a time point at which it is predicted that the contamination index reaches the allowable limit threshold is derived as a cleaning timing T from this time and a time point of the photographing timing t0 of the initial image. Information on this time point is information on the cleaning timing to be performed in the future (that is, information indicating the predicted cleaning timing). Here, the information on the predicted cleaning timing that the display device 23 notifies the operator is not limited to the time point itself but may be information on the predicted cleaning timing.

Here, when the function is derived, the contamination degree calculation unit calculates the contamination index of the initial image as zero and transmits the contamination index to the cleaning timing prediction unit 43. Moreover, a linear function which can be derived with a small amount of computation is derived as the function.

In this way, the predicted cleaning timing can be calculated on the basis of the photographing timings of a plurality of images including the initial image and the contamination degrees of a plurality of images.

Generally, when a storage capacity is insufficient, it is difficult to store a number of images. However, according to this configuration, even when a storage capacity is insufficient, it is possible to calculate a predicted cleaning timing T using the initial image and the post-operation image at a present time point t only.

Figure 6:
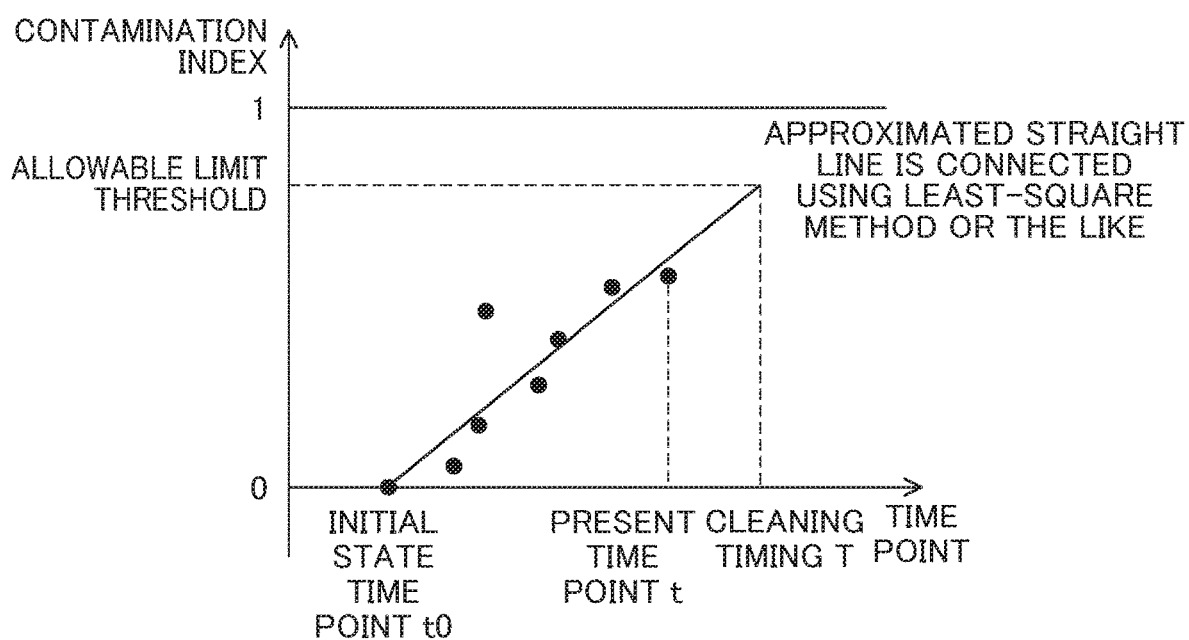
FIG. 6 is a graph for describing a method of calculating a predicted cleaning timing when there are a number of post-operation images in the lens abnormality detection system according to the embodiment.

FIG. 6 is a diagram illustrating a method of calculating the predicted cleaning timing T when there is a plurality of images after the initial image is photographed (that is, when there are a number of post-operation images).

In this case, a function is derived on the basis of the photographing timing t0 of the initial image, the photographing timings of a plurality of post-operation images, and the contamination indices of a plurality of post-operation images. For example, as illustrated in FIG. 6, an approximated straight line is derived as a function using a least-square method or the like. In this way, it is possible to calculate the predicted cleaning timing T more accurately even when an abnormal value is present in the contamination index in the middle of photographing. The function of calculating the predicted cleaning timing T is not limited to a linear function. In order to obtain more accurate prediction results, a function that draws a curve may be derived on the basis of a past record data. Moreover, information on the photographing timing and the contamination degree of a past image photographed at a timing at which cleaning is actually necessary and a number of pieces of information on the photographing timing and the contamination degree of a plurality of images obtained until the timing is reached may be acquired and machine learning may be performed using the information to construct an algorithm of calculating the predicted cleaning timing T.

In this way, the lens predicted cleaning timing can be calculated on the basis of the photographing timings of a plurality of images and the contamination degrees of the plurality of images.

Figure 7:
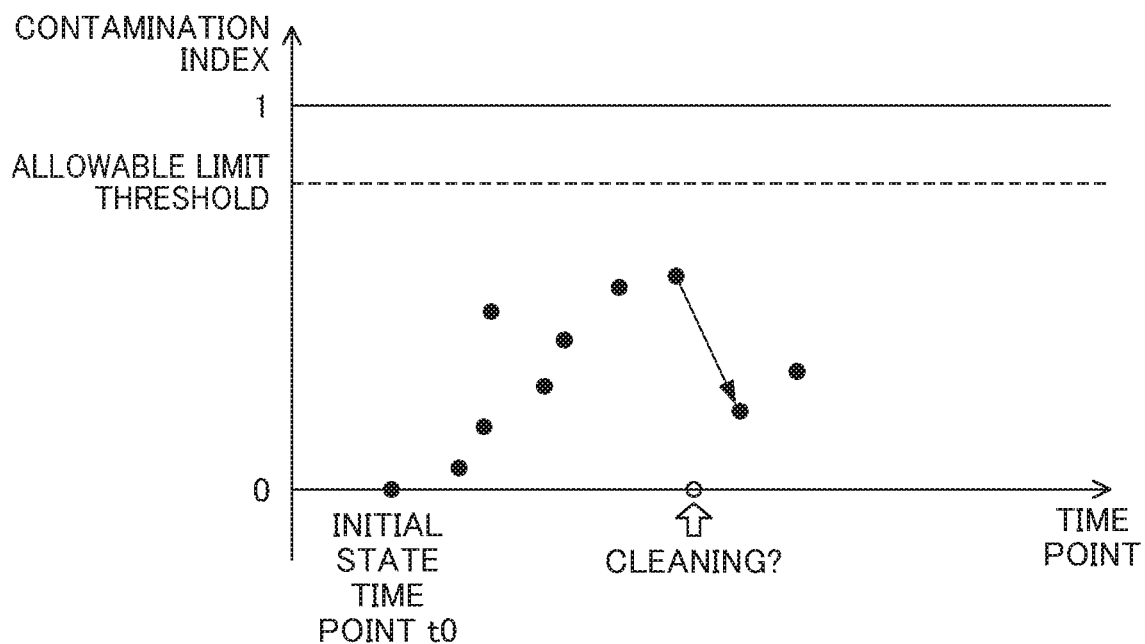
FIG. 7 is a graph for describing when a lens abnormality detection system is restarted in the lens abnormality detection system according to the embodiment.

FIG. 7 is a diagram for illustrating a process when the lens abnormality detection system is restarted. When the lens of the camera 6 is cleaned, it is necessary to reset the time point of the initial state in order to restart the lens abnormality detection system 1. As a method of executing such a restart process, a method in which an operator executes a restart process manually at a timing at which the lens is cleaned may be used. Moreover, as illustrated in FIG. 7, a method in which the contamination indices of a plurality of successive post-operation images are compared and a restart process is executed automatically when the contamination index is decreased remarkably (for example, when the contamination index is decreased by a predetermined value or more) may be used. In this way, since the restart process is performed automatically, it is possible to perform the restart process more reliably. The restart process may be a process of resetting the post-operation image immediately after the contamination index is decreased remarkably as an initial image. The restart process is executed by the restart process execution unit 44 of the arithmetic device 22, for example.

A configuration in which a confirmation screen for asking the operator whether cleaning is to be performed when the contamination index is decreased remarkably is displayed may be employed. For example, a configuration in which when the contamination index is decreased by a predetermined value or more, a message that "Please press "Restart" when lens cleaning is performed. A lens abnormality detection system will be restarted" is displayed on the display device 23 may be employed. With this configuration, it is possible to perform the restart process more reliably.

Figure 8:
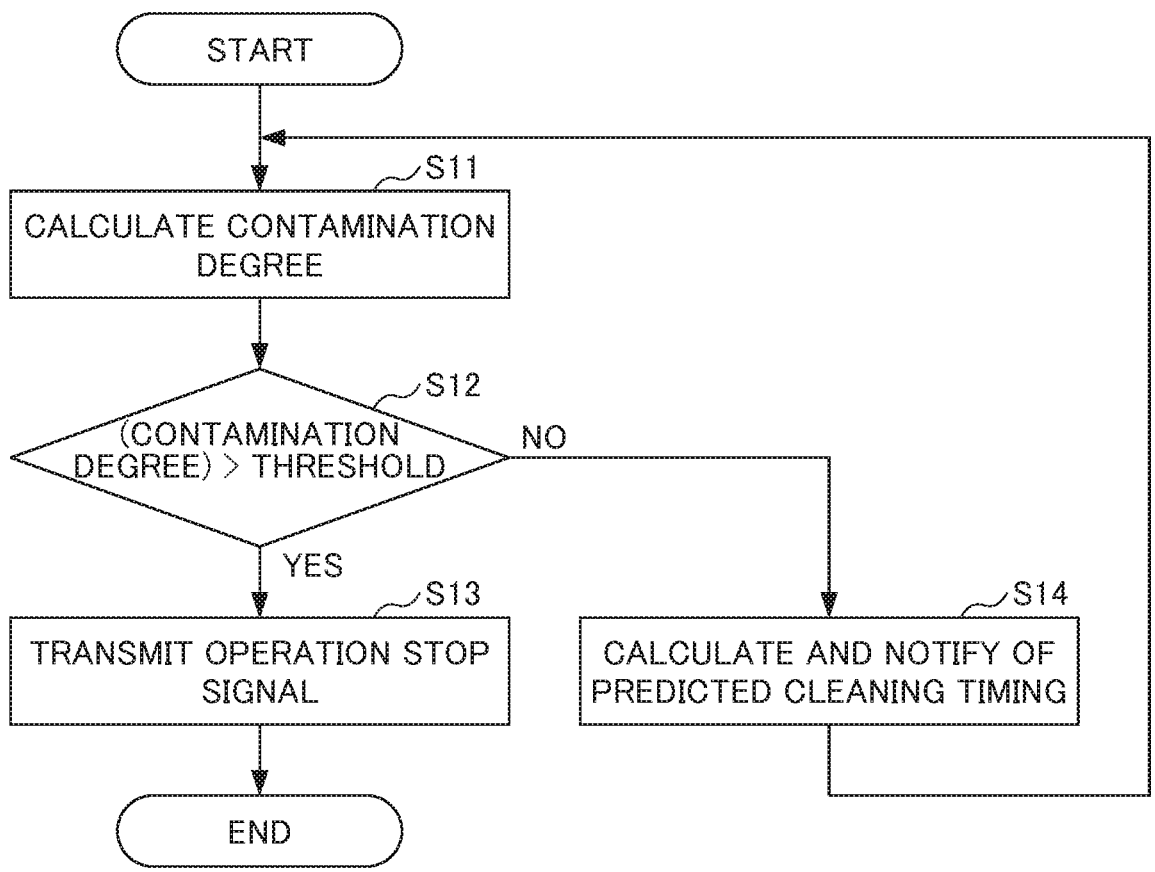
FIG. 8 is a G-code illustrating calculation and notification of a predicted cleaning timing in the lens abnormality detection system according to the embodiment.

Hereinafter, a process of the lens abnormality detection system that notifies of the predicted cleaning timing on the basis of the contamination degree of the lens of the camera 6 will be described with reference to the flowchart of FIG. 8.

In step S11, the contamination degree calculation unit 41 calculates the contamination degree of the lens of the camera 6. Subsequently, in step S12, the contamination degree determination unit 42 determines whether the contamination degree exceeds a predetermined threshold. The predetermined threshold may be the same value as the allowable limit threshold described with reference to FIG. 5 and the like.

The contamination degree determination unit 42 transmits information related to the contamination degree to the cleaning timing prediction unit 43 in order to calculate a cleaning timing to be performed in the future when the contamination degree is equal to or smaller than the threshold (step S12: NO). In step S14, the cleaning timing prediction unit 43 calculates the cleaning timing (that is, a predicted cleaning timing) to be performed in the future and the display device 23 notifies of the content thereof. After that, the flow returns to step S11. This process is repeated automatically every arbitrary period determined in advance by the operator or at a timing based on a manual operation of the operator.

On the other hand, when the contamination degree exceeds a predetermined threshold (step S12: YES), a stop signal for stopping the operation of an industrial machine such as the robot 5 is transmitted to the controller 30 in step S13. In this case, an alarm may be notified.

With such a lens abnormality detection process, since the operator can understand the cleaning timing of the lens of the camera 6 to be performed in the future, it is possible to execute maintenance at an appropriate timing and to prevent decrease in the rate of operation of a production line.

The contamination in the present invention includes various contaminations such as a cutting liquid, a scale, a dust, and a paint sprayed from an industrial machine, which is not to adhere to a camera lens. That target in which adhering of a contamination is detected is the lens or the lens cover of the camera 6. That is, if the lens itself having a function of refracting a light ray is exposed to the outer surface of a distal end of the lens holder 7 of the camera 6, the target in which adhering of a contamination is detected is the lens. If a lens cover (for example, a planar cover glass or the like) is disposed on the front surface of the lens, the target in which adhering of a contamination is detected is the lower end cover.

In the present embodiment, although the cap-shaped member 11 having the reference photographing target is provided on the pedestal 10 of the robot 5, the portion in which the cap-shaped member 11 is provided is not limited to this portion. For example, the cap-shaped member 11 may be provided on a mount 9 of the work W. In this case, it is possible to decrease the amount of movement of the robot 5 during a photographing operation for calculating the contamination degree.

In the present embodiment, although the camera 6 is fixed to the vicinity of the hand of the robot 5, the camera 6 may be provided in another portion near the robot 5. For example, the camera 6 may be provided in a movable arm separate from the robot 5 and the movable arm may be moved.

Moreover, the camera 6 may be provided fixedly in a non-movable unit such as the pedestal 10 of the robot 5 or the mount 9 of the work W. In this case, the reference photographing target may be fixed to the movable unit, and the movable unit is operated so that the reference photographing target moves so as to fall within the photographing range of the camera 6 during a photographing operation for calculating the contamination degree. Moreover, a configuration in which a reference photographing target which is freely movable is provided near the lens holder 7 of the camera 6 so as to be integrated with the camera 6 may be employed. Moreover, the camera 6 and the reference photographing target both may be fixed to the movable unit so that both move.

In the present embodiment, although an image obtained by photographing the reference photographing target is used as an image used for calculating the contamination degree, other images such as an image obtained by photographing the work W or the like may be used. In this case, although the contamination degree detection sensitivity decreases, it is possible to calculate the contamination degree without causing the robot 5 to perform an additional operation for detecting the lens abnormality.

According to the lens abnormality detection system of the present embodiment, the following advantages are obtained.

(1) The lens abnormality detection system 1 according to the present embodiment includes a contamination degree calculation unit 41 that calculates the contamination degree of the lens of the camera 6 on the basis of an image acquired by the camera 6 and the cleaning timing prediction unit 43 that calculates information on a predicted cleaning timing of the lens to be performed in the future on the basis of the contamination degree of the lens. In this way, it is possible to provide a lens abnormality detection system of the camera 6 capable of predicting the cleaning timing of the lens of the camera 6, to be performed in the future. Therefore, it is possible to execute maintenance at an appropriate timing and to prevent decrease in the rate of operation of a production line.

(2) In the lens abnormality detection system 1 according to the present embodiment, information on the predicted cleaning timing of the lens is notified on the basis of the contamination degree of the lens when a determination result obtained by the contamination degree determination unit 42 is equal to or smaller than a threshold, and a stop signal for stopping the operation of the robot 5 or the like is output when the determination result exceeds the threshold. Therefore, it is possible to perform more appropriate control depending on the contamination degree of the lens.

(3) In the lens abnormality detection system 1 according to the present embodiment, the contamination degree of the lens is calculated on the basis of comparison between information based on the initial image and information based on the post-operation image. Therefore, it is possible to calculate the contamination degree of the lens appropriately.

(4) In the lens abnormality detection system 1 according to the present embodiment, a contamination region in an image is determined on the basis of a difference between a binary image based on a pixel value of an initial image and a binary image based on a pixel value of a post-operation image, and the contamination degree of the lens is calculated on the basis of a size of the contamination region. Therefore, by performing a binarization process, it is possible to determine a contamination region accurately and easily.

(5) The lens abnormality detection system 1 according to the present embodiment further includes the reference photographing target which is a target photographed by the camera 6 when calculating the contamination degree of the lens, and a movable unit to which the camera 6 and/or the reference photographing target are fixed can operate so that the reference photographing target falls within a photographing range of the camera 6. Therefore, by using the reference photographing target, it is possible to calculate the contamination degree more accurately.

(6) In the lens abnormality detection system 1 according to the present embodiment, the predicted cleaning timing of the lens is calculated on the basis of a function derived on the basis of photographing timings of a plurality of images and the contamination degrees of the plurality of images, and an allowable limit threshold of the contamination degree of the lens. Therefore, it is possible to calculate the predicted cleaning timing accurately.

(7) The lens abnormality detection system 1 according to the present embodiment executes a restart process when a second contamination degree of the lens in a second post-operation image is decreased by a predetermined value or more from a first contamination degree of the lens in a first post-operation image. Therefore, since the restart process is performed automatically, it is possible to perform the restart process reliably.

Second Embodiment

Next, a lens abnormality detection system according to a second embodiment will be described with reference to FIGS. 9 and 10. In the following description, the same components as those of the first embodiment will be denoted by the same reference numerals, and the detailed description thereof will be omitted.

Figure 9:
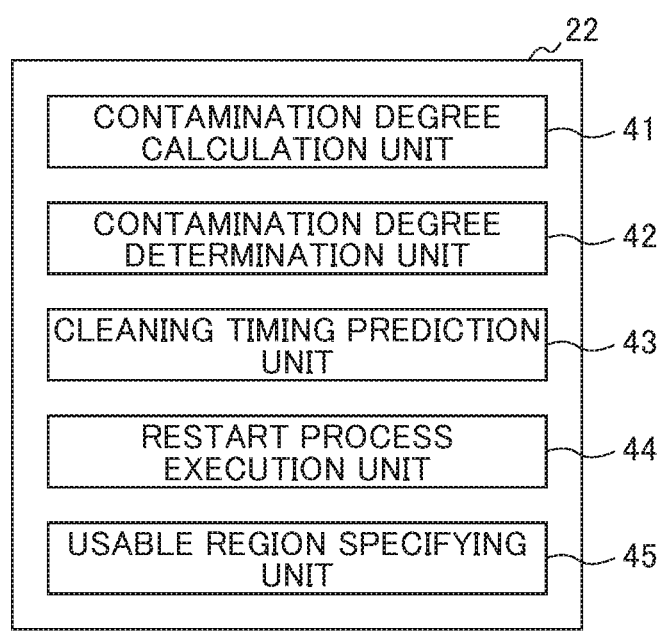
FIG. 9 is a functional block diagram illustrating a configuration of a functional module of an arithmetic device in the lens abnormality detection system according to a second embodiment of the present invention.

FIG. 9 is a functional block diagram illustrating a configuration of the functional modules of the arithmetic device 22 according to the present embodiment. The arithmetic device 22 of the present embodiment includes a usable region specifying unit 45 in addition to the functional modules illustrated in FIG. 2.

In the first embodiment, when the contamination index of the lens of the camera 6 exceeds the predetermined threshold, the operation of the robot 5 or the like is stopped in step S13. However, even when it is determined that the contamination index is equal to or larger than the predetermined threshold, a photographing position may be shifted so that a machining operation of the robot 5 or the like based on the output of the camera 6 is continued.

Figure 10A:
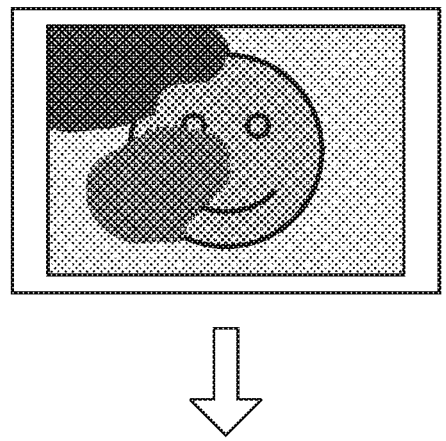
FIG. 10A is a diagram for describing a process of shifting a photographing position in the lens abnormality detection system according to the embodiment.
Figure 10B:
FIG. 10B is a diagram for describing a process of shifting a photographing position in the lens abnormality detection system according to the embodiment.
Figure 10C:
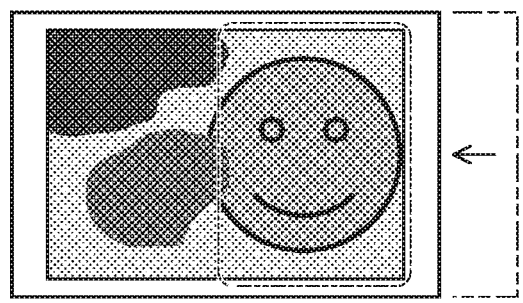
FIG. 10C is a diagram for describing a process of shifting a photographing position in the lens abnormality detection system according to the embodiment.

FIG. 10A illustrates an image when a mark of the reference photographing target is photographed. In the image, a contamination exceeding a predetermined threshold adheres. In the present embodiment, the usable region specifying unit 45 of the arithmetic device 22 of the information processing device 20 specifies a usable region in which a lens contamination is negligible in such an image photographed by the camera 6 as illustrated in FIG. 10B.

Moreover, even if the contamination index of the lens of the camera 6 exceeds the predetermined threshold, when the size of the usable region is equal to or larger than a predetermined size, a process of allowing the operation of the robot 5 or the like to be continued is performed. While the machining operation is being continued, the operation of the robot 5 or the like based on the output of the camera 6 is controlled using the usable region in which the contamination of the lens is negligible.

When the camera 6 has a movable unit as means for changing the photographing position (for example, a movable arm (not illustrated) holding the camera or a mechanism (not illustrated) for changing a photographing direction), and the size of the usable region is equal to or larger than the predetermined size, control for operating the movable unit so as to change the photographing position of the camera 6 may be performed so that the work W which is a photographing target or the mark of the reference photographing target falls within the usable region. The control for changing the photographing position is repeated until the size of the usable region is smaller than an allowable value. Moreover, when the usable region is smaller than the predetermined size, a process for stopping the operation of the robot 5 or the like is performed. As described above, the information processing device 20 of the present embodiment has the function of an information output unit that outputs information for controlling the operation of the robot 5 or the like and controlling the photographing of the camera 6. The information processing device 20 outputs information for allowing the operation of the robot 5 to be continued when the size of the usable region is equal to or larger than the predetermined size and outputs information for stopping the operation of the robot 5 when the size of the usable region is smaller than the predetermined size. Due to such a configuration, it is possible to further improve the rate of operation of a production line.

The determination as to whether the lens contamination is a negligible usable region may not follow the binarization method, but various methods such as a method of acquiring the difference image using the pixel value of an image itself may be used.

According to the lens abnormality detection system of the present embodiment, the following advantages are obtained in addition to the advantages (1) to (7).

(8) In the present embodiment, when the size of a usable region in which the contamination of the lens is negligible is equal to or larger than a predetermined size, the operation of the industrial machine is continued. Therefore, it is possible to further improve the rate of operation of the production line.

(9) In the present embodiment, when the size of a usable region in which the contamination of the lens is negligible is equal to or larger than a predetermined size, the movable unit is operated so as to change the photographing position of the camera 6 so that at least a portion of a photographing target object is photographed within the usable region. Therefore, it is possible to further improve the rate of operation of the production line.

Third Embodiment

Next, a lens abnormality detection system according to a third embodiment will be described with reference to FIGS. 11 and 12. In the following description, the same components as those of the first embodiment will be denoted by the same reference numerals, and the detailed description thereof will be omitted.

Figure 11A:
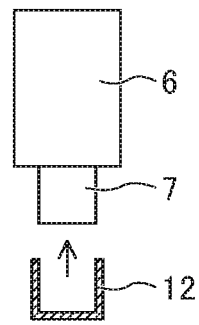
FIG. 11A is a schematic diagram illustrating a camera and a lens cap including reservation reception process in a lens abnormality detection system according to a second embodiment of the present invention.
Figure 12:
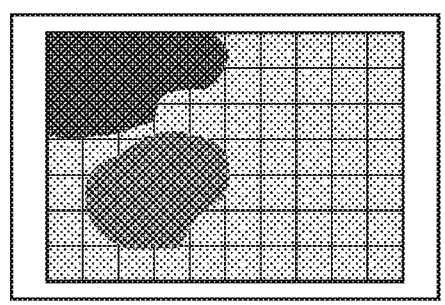
FIG. 12 is a diagram illustrating an image obtained in a state in which a lens cap is attached to a camera in the lens abnormality detection system according to the embodiment.

FIG. 11A is a schematic diagram illustrating a lens cap 12 including a reference photographing target and the camera 6 according to the present embodiment. In the present embodiment, the reference photographing target is provided on a bottom portion on an inner surface side of the lens cap 12.

Figure 11B:
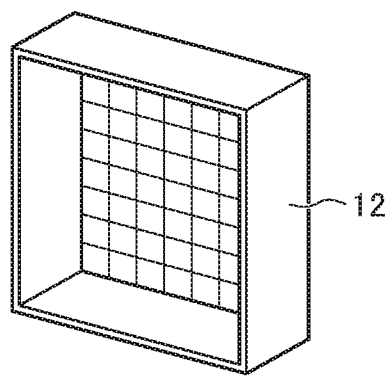
FIG. 11B is a schematic diagram illustrating a camera and a lens cap included in a reference photographing target in a lens abnormality detection system according to the third embodiment.

In this configuration, it is possible to acquire an image for calculating the contamination degree just by putting the lens cap 12 on the lens holder 7 of the camera 6 manually. Therefore, in this case, it is not necessary to move the camera 6. As illustrated in FIG. 11B, a grid-shaped mark may be provided on the bottom portion on the inner surface side of the lens cap 12. FIG. 12 illustrates an image obtained when the lens cap 12 having such a mark is attached and an image is photographed. Due to the grid-shaped mark, when a contamination adhered to the lens, and the control of changing the photographing position of the camera 6 is performed so that at least a portion of the target object such as the work W falls within the usable region, the control of changing the photographing position can be performed appropriately on the basis of information processed using the mark as a reference. Moreover, the mark is also used as a reference during the focus adjustment of the camera 6.

According to the lens abnormality detection system of the present embodiment, the following advantages are obtained in addition to the advantages (1) to (9).

(10) In the present embodiment, the reference photographing target is the lens cap 12 that covers the lens of the camera 6. Therefore, it is possible to acquire an image for calculating the contamination degree easily just by putting the lens cap 12 on the camera 6 manually. Moreover, in this case, it is not necessary to move the camera 6.

Fourth Embodiment

Next, a lens abnormality detection system according to a fourth embodiment will be described with reference to FIG. 13. In the following description, the same components as those of the first embodiment will be denoted by the same reference numerals, and the detailed description thereof will be omitted.

Figure 13:
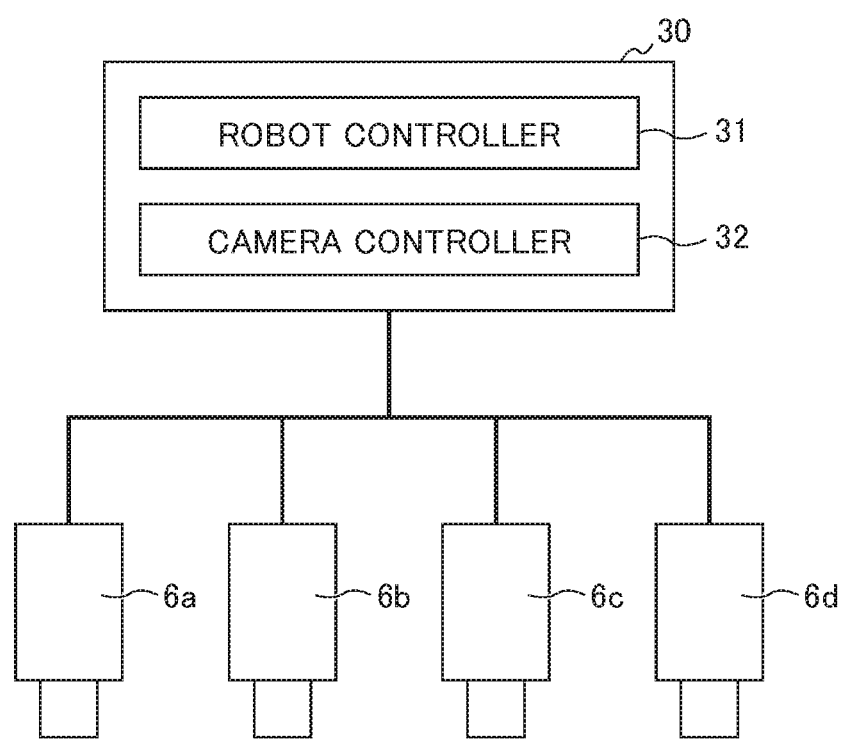
FIG. 13 is a diagram illustrating a controller and camera in a lens abnormality detection system according to a fourth embodiment of the present invention.

FIG. 13 is a diagram illustrating the camera 6 and the controller 30 according to the present embodiment. In the present embodiment, a robot controller 31 is separated from a camera controller 32. Moreover, a plurality of cameras 6*a* to 6*d* is connected to the camera controller 32.

Due to this configuration, when the contamination degree determination unit 42 of the arithmetic device 22 of the information processing device 20 determines that the contamination degree of the lens of any one camera (for example, a first camera 6*a*) among the plurality of cameras 6*a* to 6*d* exceeds a predetermined threshold, it is determined whether there is a camera in which the contamination degree of the lens is equal to or smaller than the predetermined threshold among the other cameras 6*b* to 6*d*. Moreover, when there is a camera in which the contamination degree of the lens is equal to or smaller than the predetermined threshold among the other cameras, one camera is selected among the other cameras in which the contamination degree of the lens is equal to or smaller than the predetermined threshold instead of the first camera 6*a* and photographing is continued. In this case, when there is a plurality of cameras in which the contamination degree of the lens is equal to or smaller than the predetermined threshold, a camera having the smallest contamination degree may be selected and used preferentially.

As described above, the information processing device 20 including the contamination degree determination unit 42 of the present embodiment has the function of an information output unit that outputs information for controlling the operation of the robot 5 or the like and controlling the photographing of the camera 6. When a camera in which the contamination degree of the lens exceeds the predetermined threshold is detected, photographing of the work W is continued using another camera in which the contamination degree of the lens is equal to or smaller than the predetermined threshold instead of the camera and information for causing the operation of the robot 5 or the like to be continued is output to the controller 30.

All of the plurality of cameras may be provided in the robot 5 and may be distributed to the robot 5 and a portion other than the robot 5. Moreover, the plurality of cameras may be attached to a movable unit (not illustrated) other than the robot 5, and a plurality of robots and the plurality of cameras 6*a* to 6*d* may be used in combination appropriately depending on a situation. According to this configuration, it is possible to improve the rate of operation by performing control so as to use another camera when any one of the cameras has failed without being limited to when the contamination of the lens becomes gets worse. Due to such a configuration, it is possible to improve the rate of operation of a production line.

According to the lens abnormality detection system of the present embodiment, the following advantage is obtained in addition to the advantages (1) to (10).

(11) In the present embodiment, the contamination degrees of the lenses of the plurality of cameras 6*a* to 6*d* are calculated, and when a camera in which the contamination degree of the lens exceeds a predetermined threshold is detected, photographing is continued using another camera in which the contamination degree of the lens is equal to or smaller than the predetermined threshold instead of the camera and the operation of the robot 5 or the like is continued. Therefore, it is possible to further improve the rate of operation of a production line.

In the respective embodiments, although a lens has been described as a target in which adhering of a contamination is detected, when a lens cover is disposed on a front surface of the lens, the target in which adhering of the contamination is detected is the lens cover. That is, the abnormality detection system of the present invention can be configured as a visual sensor lens or lens cover abnormality detection system. The present invention is not limited to the above-described embodiments, and modifications, improvements, and the like made within the objects of the present invention can be achieved also fall within the scope of the present invention.

EXPLANATION OF REFERENCE NUMERALS

1: Lens abnormality detection system
5: Robot (Industrial machine)
6: Camera (Visual sensor)
8: Illumination unit
10: Pedestal
11: Cap-shaped member
12: Lens cap
20: Information processing device
21: Image processing device
22: Arithmetic device
23: Display device
30: Controller
31: Robot controller
32: Camera controller
41: Contamination degree calculation unit
42: Contamination degree determination unit
43: Cleaning timing prediction unit
44: Restart process execution unit
45: Usable region specifying unit

What is claimed is:

1. A visual sensor lens or lens cover abnormality detection system including a visual sensor that is provided in an industrial machine or the vicinity thereof to acquire a plurality of pieces of image data, comprising:
a calculation unit that calculates a contamination degree of the lens or the lens cover of the visual sensor on the basis of the image data photographed by the visual sensor; and
a prediction unit that calculates information on a predicted cleaning timing to be performed in the future, of the lens or the lens cover on the basis of a plurality of calculations of the contamination degree of the lens or the lens cover calculated by the calculation unit, each of the plurality of calculations being from a respective one of a plurality of images photographed by the visual sensor.

2. The visual sensor lens or lens cover abnormality detection system according to claim 1, further comprising:
a determination unit that determines whether the contamination degree of the lens or the lens cover is equal to or smaller than a predetermined threshold;
a notification unit that notifies of the information on the predicted cleaning timing; and
a stop signal output unit that outputs a stop signal for stopping an operation of the industrial machine, wherein
the notification unit notifies of the information on the predicted cleaning timing when a determination result obtained by the determination unit is equal to or smaller than the threshold, and
the stop signal output unit outputs the stop signal when the determination result obtained by the determination unit exceeds the threshold.

3. The visual sensor lens or lens cover abnormality detection system according to claim 1, wherein
the calculation unit calculates the contamination degree of the lens or the lens cover on the basis of comparison between information based on an initial image and information based on a post-operation image.

4. The visual sensor lens or lens cover abnormality detection system according to claim 3, wherein
the calculation unit determines a contamination region in an image on the basis of a difference between a binary image based on a pixel value of the initial image and a binary image based on a pixel value of the post-operation image and calculates the contamination degree of the lens or the lens cover on the basis of a size of a contamination region in the image.

5. The visual sensor lens or lens cover abnormality detection system according to claim 1, further comprising:
a reference photographing target which is a target photographed by the visual sensor when calculating the contamination degree of the lens or the lens cover, wherein
the visual sensor and/or the reference photographing target is fixed to a movable unit, and the movable unit is operable so that the reference photographing target falls within a photographing range of the visual sensor.

6. The visual sensor lens or lens cover abnormality detection system according to claim 1, further comprising:
a reference photographing target which is a target photographed by the visual sensor when calculating the contamination degree of the lens or the lens cover, wherein
the reference photographing target is a lens cap that covers the lens or the lens cover of the visual sensor.

7. The visual sensor lens or lens cover abnormality detection system according to claim 1, wherein
the predicted cleaning timing is calculated on the basis of a function derived on the basis of photographing timings of the plurality of images and the contamination degrees of the plurality of images, and an allowable limit threshold of the contamination degree of the lens or the lens cover.

8. The visual sensor lens or lens cover abnormality detection system according to claim 1, further comprising:
a restart process execution unit that compares a first contamination degree of the lens or the lens cover in a first post-operation image and a second contamination degree of the lens or the lens cover in a second post-operation image photographed at a timing subsequent to the first post-operation image and executes a restart process of the abnormality detection system on the basis of a comparison result, wherein
the restart process execution unit executes the restart process when the second contamination degree is decreased by a predetermined value or more from the first contamination degree.

9. The visual sensor lens or lens cover abnormality detection system according to claim 1, further comprising:
a determination unit that determines whether the contamination degree of the lens or the lens cover exceeds a predetermined threshold;
a usable region specifying unit that specifies a usable region in which the contamination of the lens or the lens cover is negligible in the image photographed by the visual sensor; and
an information output unit that outputs information for controlling an operation of the industrial machine, wherein
the usable region specifying unit specifies the usable region when a determination result obtained by the determination unit exceeds the threshold, and
the information output unit outputs information for causing the operation of the industrial machine to be continued when the size of the usable region specified by the usable region specifying unit is a predetermined size or more, and the information output unit outputs information for stopping the operation of the industrial machine when the size of the usable region is smaller than the predetermined size.

10. The visual sensor lens or lens cover abnormality detection system according to claim 9, wherein
the visual sensor has a movable unit for changing a photographing position, and
when the size of the usable region is equal to or larger than the predetermined size, the movable unit is operated so as to change the photographing position of the visual sensor so that at least a portion of a photographing target object is within the usable region.

11. The visual sensor lens or lens cover abnormality detection system according to claim 1, further comprising:
an information output unit that outputs information for controlling an operation of the industrial machine and the visual sensor, wherein
a plurality of visual sensors are provided,
the calculation unit calculates the contamination degree of the lens or the lens cover of each of the plurality of visual sensors, and
when a visual sensor in which the contamination degree of the lens or the lens cover exceeds a predetermined threshold is detected, the information output unit causes photographing to be continued using another visual sensor in which the contamination degree of the lens or the lens cover is equal to or smaller than the predetermined threshold instead of the visual sensor and outputs information for causing the operation of the industrial machine to be continued.

12. The visual sensor lens or lens cover abnormality detection system according to claim 1, further comprising a display that presents the information on the predicted cleaning timing to be performed in the future based on calculations from the plurality of images.

13. The visual sensor lens or lens cover abnormality detection system according to claim 1, further comprising deriving a mathematical function from the plurality of images from the visual sensor and a photographing timing of the plurality of images and using the mathematical function to predict the cleaning timing to be performed in the future.

14. The visual sensor lens or lens cover abnormality detection system according to claim 13, wherein the mathematical function is derived from a plurality of data points, each of the plurality of data points corresponding to one of the plurality of images.

15. The visual sensor lens or lens cover abnormality detection system according to claim 13, wherein the mathematical function is derived from a curve fit method.

16. A non-transitory computer-readable medium having a visual sensor lens or lens cover abnormality detection program recorded thereon, the program causing a computer that forms an information processing device of a visual sensor lens or lens cover abnormality detection system including a visual sensor that is provided in an industrial machine or the vicinity thereof to acquire a plurality of pieces of image data to realize:
a calculation function of calculating a contamination degree of the lens or the lens cover of the visual sensor on the basis of the image data photographed by the visual sensor; and
a prediction function of calculating information on a predicted cleaning timing to be performed in the future, of the lens or the lens cover on the basis of a plurality of calculations of the contamination degree of the lens or the lens cover calculated by the calculation function, each of the plurality of calculations being from a respective one of a plurality of images photographed by the visual sensor.

17. The non-transitory computer-readable medium according to claim 16, the program causing a display to present the information on the predicted cleaning timing to be performed in the future based on calculations from the plurality of images.

18. The non-transitory computer-readable medium according to claim 16, the computer program configured to derive a mathematical function from the plurality of images from the visual sensor and a photographing timing of the plurality of images and using the mathematical function to predict the cleaning timing to be performed in the future.

19. The visual sensor lens or lens cover abnormality detection system according to claim 18, wherein the mathematical function is derived from a plurality of data points, each of the plurality of data points corresponding to one of the plurality of images.

20. The visual sensor lens or lens cover abnormality detection system according to claim 18, wherein the mathematical function is derived from a curve fit method.

* * * * *